(12) United States Patent
Kawai

(10) Patent No.: US 6,209,827 B1
(45) Date of Patent: Apr. 3, 2001

(54) CLAMP DEVICE

(75) Inventor: Tsutomu Kawai, Nagoya (JP)

(73) Assignee: Kitagawa Industries Co., Ltd., Nagoya (JP)

( * ) Notice: Subject to any disclaimer, the term of this patent is extended or adjusted under 35 U.S.C. 154(b) by 0 days.

(21) Appl. No.: 09/323,725

(22) Filed: Jun. 1, 1999

(30) Foreign Application Priority Data

Jun. 22, 1998 (JP) .................................................. 10-175020

(51) Int. Cl.$^7$ ....................................................... F16L 3/00
(52) U.S. Cl. ............................... 248/73; 248/49; 248/74.3
(58) Field of Search ........................... 248/73, 74.3, 74.2, 248/68.1, 49, 316.1; 24/289, 297, 16 PB

(56) References Cited

U.S. PATENT DOCUMENTS

| 1,802,964 | * | 4/1931 | Brady | 248/73 |
|---|---|---|---|---|
| 2,541,828 | * | 2/1951 | Peck | 303/84.2 |
| 3,015,869 | * | 1/1962 | Rapata | 248/73 |
| 4,131,258 | * | 12/1978 | Okuda et al. | 248/73 |
| 4,262,394 | | 4/1981 | Wright | 24/73 RM |
| 4,422,222 | * | 12/1983 | Notoya | 24/614 |
| 4,439,896 | * | 4/1984 | Matsui | 24/16 PB |
| 4,470,178 | * | 9/1984 | Matsui | 24/289 |
| 4,564,163 | * | 1/1986 | Barnett | 248/71 |
| 4,609,171 | * | 9/1986 | Matsui | 248/4.3 |
| 4,677,714 | | 7/1987 | Wright | 24/590 |
| 5,368,261 | * | 11/1994 | Caveney et al. | 248/73.4 |
| 5,601,260 | * | 2/1997 | Shinohara et al. | 248/68.1 |
| 6,116,804 | * | 9/2000 | Mehta | 402/38 |

FOREIGN PATENT DOCUMENTS 57-58921 * 4/1982 (JP) .

* cited by examiner

Primary Examiner—Anita M. King
Assistant Examiner—N. Morrison
(74) Attorney, Agent, or Firm—Davis & Bujold, P.L.L.C.

(57) ABSTRACT

A clamp device which can be easily attached/detached and securely fixed to a board. In order to attach an electric wire bundle clamp to the board, a leg portion of the clamp is inserted in a circular hole of an attachment hole provided in the board, while engaging protruding pieces of the clamp are similarly inserted into notches of the board. Subsequently, the electric wire bundle clamp is rotated 90 degrees, allowing a portion of the board around the circular hole to be held between a base on the surface of the board and the engaging protruding pieces contacting on the underside of the board. Once rotated an engagement protrusion comes to rest in an engagement hole of the board preventing further rotation and firmly fixing the clamp device relatively to the board.

6 Claims, 8 Drawing Sheets

CLAMP DEVICE

BACKGROUND OF THE INVENTION (1.) Field of the Invention

The present invention relates to a clamp device.

(2.) Description of the Related Art

In the conventional art, an electric wire bundle clamp has been widely used for fixing a bundle of wired electric cables to a board, such as a chassis or a panel of an electronic appliance. Two patents in the conventional art are U.S. Pat. No. 4,609,171 issued Sep. 2, 1986 to Kazuhiro Matsui and U.S. Pat. No. 4,439,896 issued Apr. 3, 1984 to Kazuhiro Matsui. In the former patent disclosed is a method of attaching the electric wire bundle to the board using an adhesive tape. In the latter patent a pair of elastic engaging pieces are formed on a tip end of a support formed on the lower portion of the electric wire bundle clamp and the engaging pieces are then inserted in a fixing hole formed in the board to attach the clamp to the board, where the elastic engaging pieces can be expanded/opened in opposite directions.

In the method of using the adhesive tape, once the electric wire bundle clamp is attached to the board, it cannot be easily detached. Therefore, the method cannot be used if the clamp needs to be repeatedly attached/detached.

Moreover, in the method of using the elastic engaging pieces, the elastic engaging pieces protrude from the underside of the board. These protruded portions inhibit the miniaturization of an electronic apparatus to which the board is attached. When the elastic engaging pieces are merely inserted to the fixing hole formed in the board, the support can be rotated around the fixing hole. Therefore, the electric wire bundle clamp cannot be firmly fixed, and the direction of the electric wire bundle cannot be defined. Furthermore, when the electric wire bundle clamp is detached from the board, the pair of elastic engaging pieces need to be held and closed with a jig before being disengaged from the fixing hole. This detaching operation must be performed from the underside of the board, thus making working conditions difficult. In addition, when the elastic engaging pieces are just inserted to the fixing hole formed in the board, the electric wire bundle clamp tends to fall by a force applied to the bundle of electric wires.

SUMMARY OF THE INVENTION

Wherefore, an object of the present invention is to provide a clamp device which slightly protrudes from the underside of a board when firmly attached to the board.

Another object of the present invention is to provide a clamp device that is both easily attachable and detachable from the board.

To attain those and other objects, the present invention provides a clamp device having a base. Protruding from the underside of the base is a leg portion, of which extending from the leg portion's tip end is an engaging protruding piece. This engaging protruding piece extends in parallel with the underside of the base. Additionally, extending from the base is a pressing wing portion, which has protruding from an underside an engagement protrusion and from a topside a protruding portion that extends above the base. The protruding portion is placed between the leg portion and the engagement protrusion. It is to be appreciated that the engaging protruding piece and the pressing wing portion are preferably arranged substantially vertical to each other.

To fix the clamp device of the present invention to a board the leg portion, having the engaging protruding piece, is inserted in a hole made in a board having a thickness corresponding to a distance between the base and the leg portion. The engaging protruding piece, being inserted through a notch made around the hole in the board, engages an underside of the board when rotating the clamp. The clamp device is rotated until the engagement protrusion engages in an engagement hole made in the board. As such, with the engagement protrusion engaged in the engagement hole, the portion of the board around the hole being held between the base and the engaging protruding piece, and the tip end of the pressing wing portion abutting and pressing on a topside of the board, the clamp device is firmly fixed to the board.

DETAILED DESCRIPTION OF PREFERRED EMBODIMENT

Figure 1A:
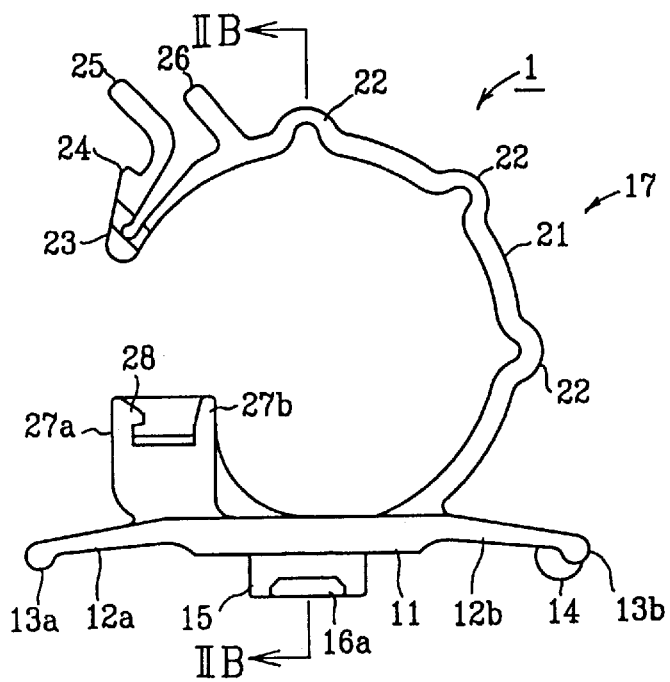
FIGS. 1A, 1B and 1C are a front view, a right-side view and a bottom view, respectively, of an electric wire bundle clamp according to an embodiment of the present invention.
Figure 1B:
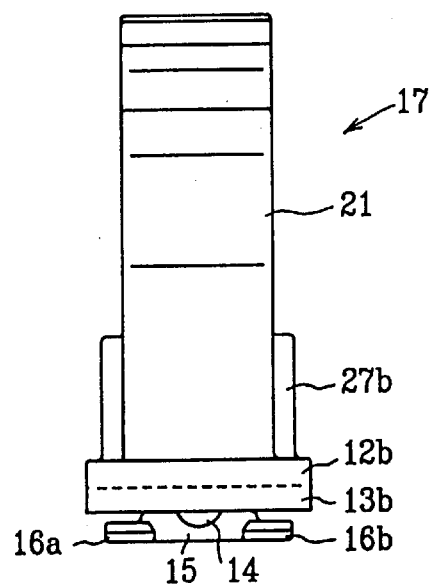
Figure 1C:
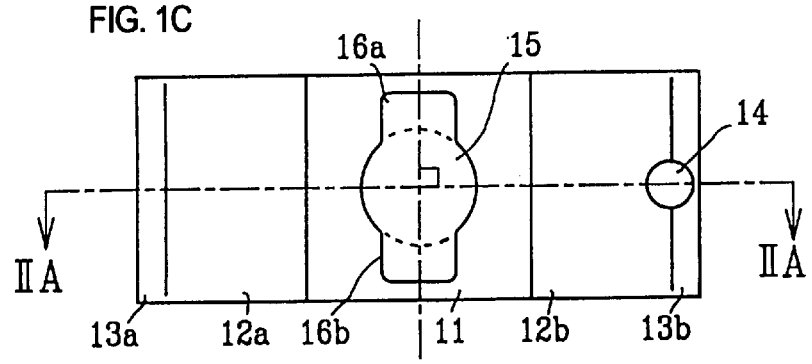

A preferred embodiment of the present invention will be described with reference to the drawings.

Referring to FIGS. 1A–1C and FIGS. 2A–2C, the clamp device or electric wire bundle clamp 1 is provided with a base 11, pressing wing portions 12a, 12b, pressing protrusions 13a, 13b, an engagement protrusion 14, a leg portion 15, engaging protruding pieces 16a, 16b, and a clamp member 17.

The base 11 is formed of a rectangular flat thin plate. The pressing wing portions 12a, 12b extend from the base 11 in opposite directions, and curve downward on the opposite sides of the base 11. The base 11 and the pressing wing portions 12a, 12b form a downward curved short strip. The pressing protrusions 13a, 13b are formed under the tip ends of the pressing wing portions 12a, 12b, respectively. The pressing protrusions 13a, 13b extend in the width directions of the pressing wing portions 12a, 12b, respectively. Provided with the middle portion of the pressing protrusion 13b is the hemispherical engagement protrusion 14. The engagement protrusion 14 partially extends on the lower face of the pressing wing portion 12b.

The cylindrical leg portion 15 extends downward from the middle of the flat lower face of the base 11. From the lower end of the leg portion 15 extending in parallel with the lower face of the base 11 are the engaging protruding pieces 16a, 16b. Preferably, each of the engaging protruding pieces 16a, 16b is shaped as a rectangular flat thin plate. Additionally, the engaging protruding pieces 16a, 16b are arranged substantially vertical to the pressing wing portions 12a, 12b.

The clamp member 17 is formed on the base 11. The clamp member 17 is provided with a C-shaped elastic curved strip 21, elastic protrusions 22, a turned edge 23, an engaging protruding portion 24, a clamp operating piece 25, a finger operating piece 26, protrusions 27a, 27b, and an engaging piece 28. These components 21 to 28 of the clamp member 17 are the same as the corresponding components described in the above-mentioned U.S. Pat. No. 4,609,171, and the teachings of which is hereby incorporated by reference.

The fixed end of the protruding portion or curved strip 21 is connected to the upper end of the base 11 on the side of the protrusion 13b. Specifically, the fixed end of the curved strip 21 is disposed between the leg portion 15 and the engagement protrusion 14.

Three elastic protrusions 22 are formed in the width direction or electric wire bundle inserting direction on the curved strip 21 by partially bending the curved strip 21 outward. Therefore, the maximum holding diameter of the curved strip 21 can be slightly enlarged/reduced in accordance with the number or amount of electric wires to be bundled, and the stress concentration can be moderated. Additionally, the curved strip 21 is arranged substantially in the same direction as the extending direction of the pressing wing portions 12a, 12b.

The V-shaped turned edge 23 is formed by bending and elastically deforming the open end of the curved strip 21 outward. The stepped engaging protruding portion 24 is formed on the outer face of the raised tip of the turned edge 23. The clamp operating piece 25 is formed by bending the tip end of the engaging protruding portion 24 outward relative to the curved strip 21. The finger operating piece 26 is formed on the curved strip 21 above and opposite to the clamp operating piece 25. When an operator picks the finger operating piece 26 and the clamp operating piece 25 close to each other with fingers, the turned edge 23 is elastically deformed in the direction in which the engaging protruding portion 24 comes closer to the curved strip 21 and the V-shape of the turned edge 23 is narrowed.

The protrusions 27a, 27b formed on the base 11 have an interval or space therebetween, in which the turned edge 23 is elastically deformed and inserted. The engaging piece 28 for engaging with the elastically deformed engaging protruding portion 24, when inserted, is formed on the inner side wall of the outer protrusion 27a, so to oppose the engaging protruding portion 24.

It is to be appreciated that all the components of the electric wire bundle clamp 1 are integrally formed by injection-molding of a plastic material having an elastic restoring force such as polypropylene resin, nylon resin, and the like.

Figure 3:
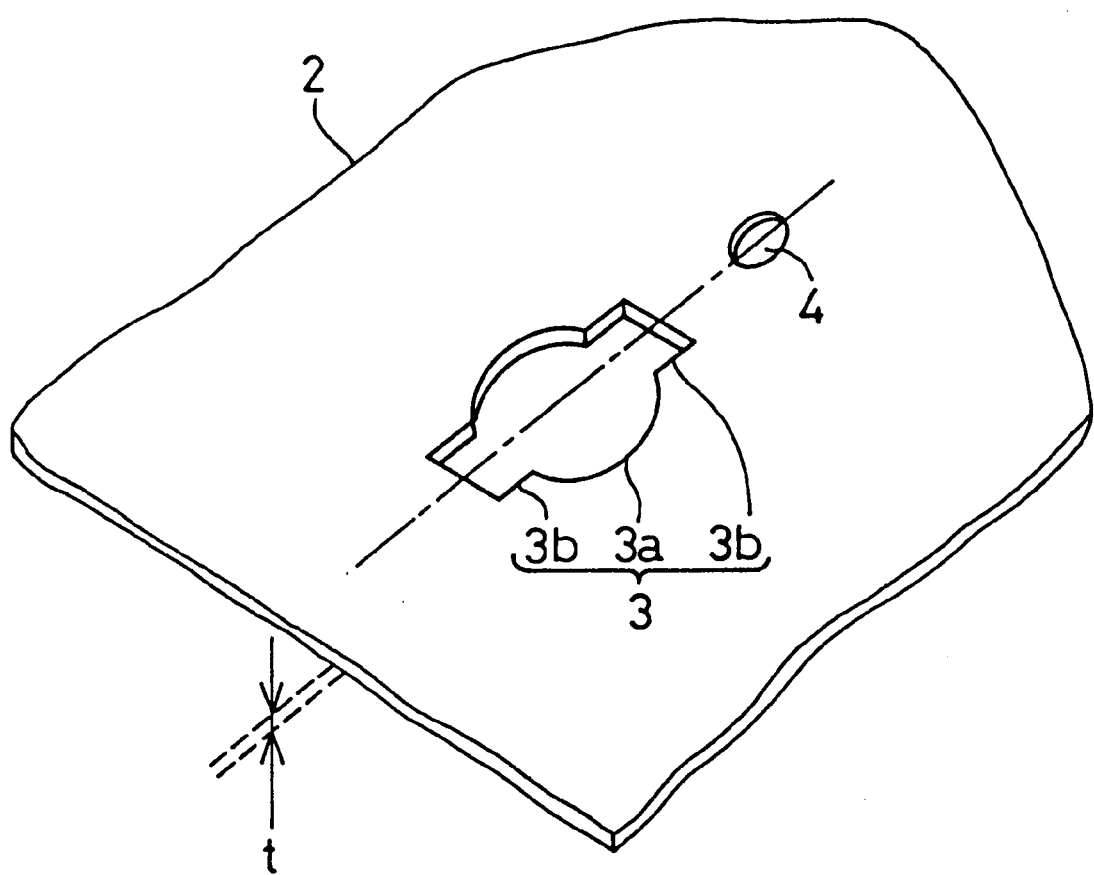
FIG. 3 is a perspective view of a board to which the electric wire bundle clamp of the embodiment is fixed.

FIG. 3 is a perspective view of a board 2 to which the electric wire bundle clamp 1 is fixed as seen from its surface.

An attachment hole 3 and an engagement hole 4 are formed in the board 2, e.g., a chassis, a panel, or the like.

The attachment hole 3 is formed of a circular hole 3a, and two notches 3b formed in the periphery of the circular hole 3a. The leg portion 15 of the electric wire bundle clamp 1 is inserted to the circular hole 3a, while the engaging protruding pieces 16a, 16b of the electric wire bundle clamp 1 are inserted into the notches 3b, respectively.

The engagement protrusion 14 of the electric wire bundle clamp 1 is engaged in the circular engagement hole 4. The engagement hole 4 is formed substantially in the same direction in which the notches 3b of the attachment hole 3 are arranged in the board 2.

The operation of the electric wire bundle clamp 1 having the aforementioned structure will next be described with reference to FIGS. 4A, 4B and 5.

Figure 4A:
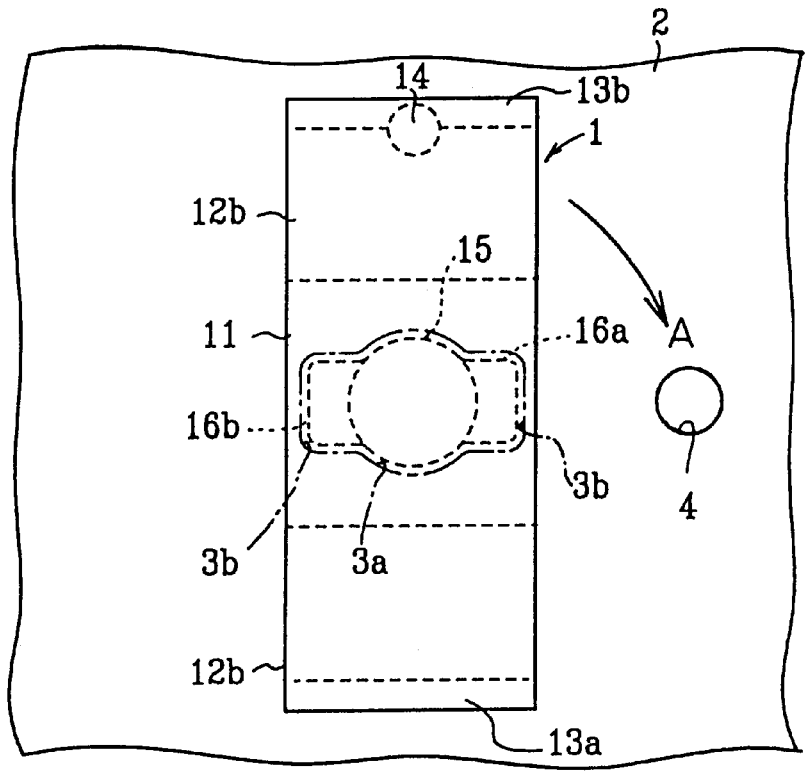
FIGS. 4A and 4B are plan views for use in the description of the operation of the electric wire bundle clamp according to the embodiment.
Figure 4B:
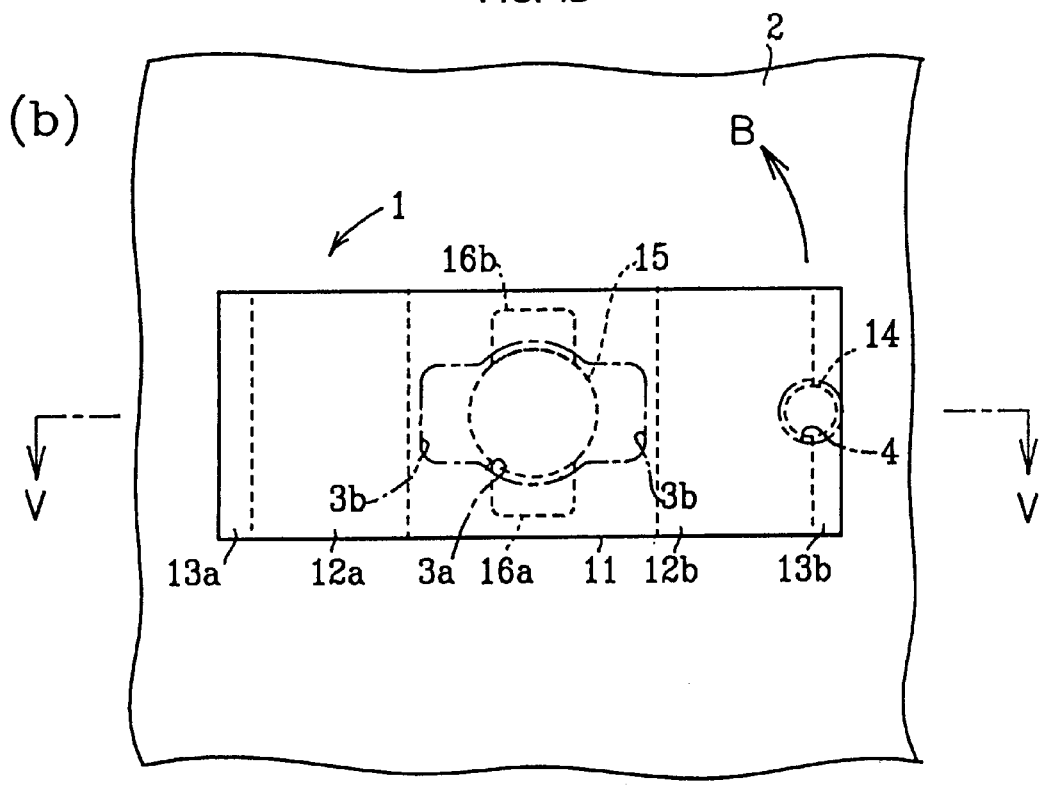

In FIGS. 4A and 4B, the clamp member 17 is omitted for convenience in order to facilitate the understanding of the conditions of the leg portion 15 and the engaging protruding pieces 16a, 16b relative to the board 2.

In order to attach the electric wire bundle clamp 1 to the board 2, as shown in FIG. 4A, the leg portion 15 is inserted into the circular hole 3a of the attachment hole 3, while the engaging protruding pieces 16a, 16b are inserted to the notches 3b.

As shown, the attachment hole 3 is dimensioned in such a manner to allow the leg portion 15 and the engaging protruding pieces 16a, 16b to be easily inserted into the board 2. To facilitate this easy insertion a small clearance gap exists when the leg portion 15 and the engaging protruding pieces 16a, 16b are inserted into the circular hole 3a, and notches 3b, respectively. It is to be appreciated that this gap formed between the clamp device and the attachment hole 3 is not unnecessarily large.

Figure 2A:
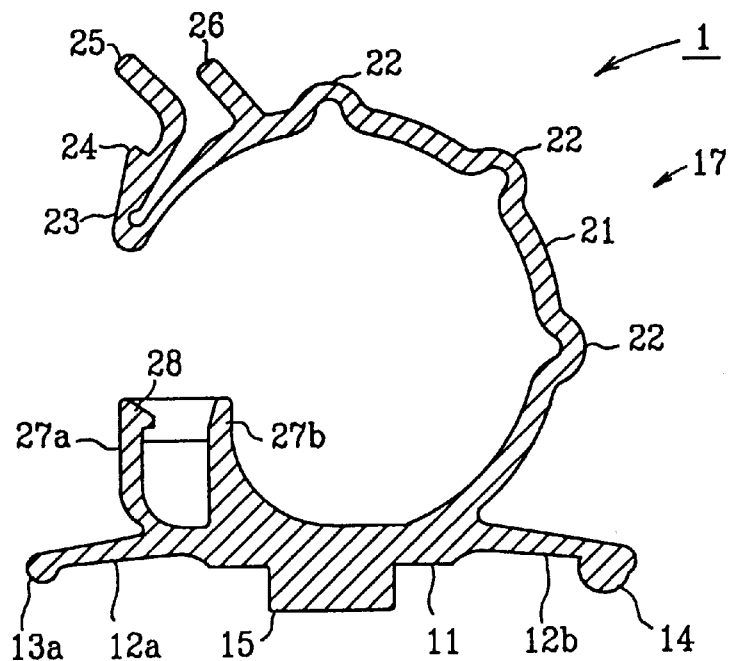
FIG. 2A is a sectional view taken along line IIA—IIA of FIG. 1C.
Figure 2B:
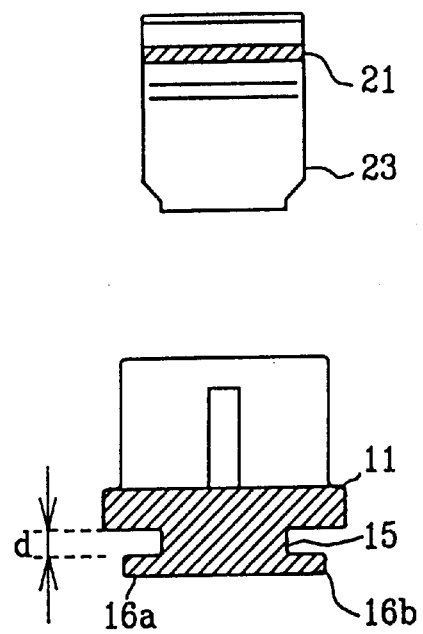
FIG. 2B is a sectional view taken along line IIB—IIB of FIG. 1A.

The distance d between the bottom face of the base 11 of the electric wire bundle clamp 1 and the top surface of each of the engaging protruding pieces 16a, 16b as shown in FIG. 2B is set slightly larger than the thickness t of the board 2 shown in FIG. 3.

To fix the clamp device 1 to the board 2, with the clamp device inserted into the board as described above, an operator rotates the clamp member 17 with fingers (not shown) in the direction shown by an arrow 'A' of FIG. 4A to turn the engaging protruding pieces 16a, 16b into contact with an underside of the board 2. Specifically, the engaging protruding pieces 16a, 16b engage the portion of the board 2 adjacent the circular hole 3a when turned with the portion of the board 2 around the circular hole 3a entering in a gap between the base 11 and the engaging protruding pieces 16a, 16b. Subsequently, as shown in FIG. 4B, when the electric wire bundle clamp 1 is rotated by 90 degrees from the condition shown in FIG. 4A, the portion of the board 2 around the circular hole 3a is held between the base 11 positioned on the surface of the board 2 and the engaging protruding pieces 16a, 16b positioned on the underside of the board 2.

Figure 5:
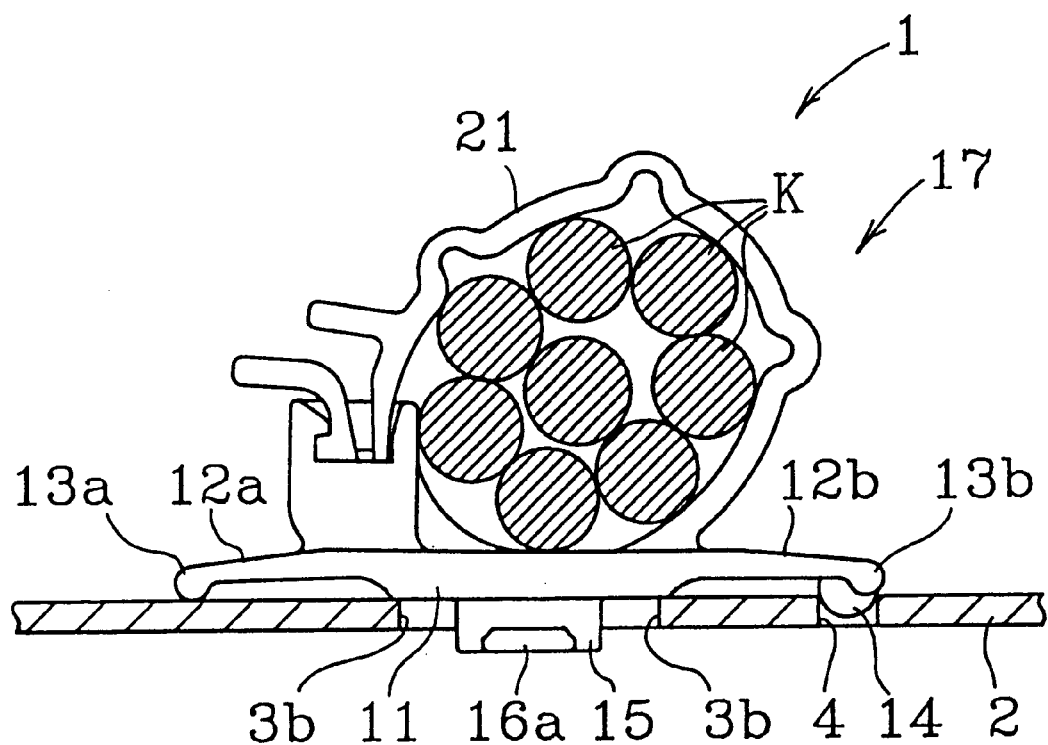
FIG. 5 is a sectional view taken along line V—V of FIG. 4B.

Referring to FIG. 5, the pressing wing portions 12a, 12b are formed of a plastic material having an elastic restoring force, and are curved toward the board 2. As shown in FIG. 4B and FIG. 5, the pressing protrusions 13a, 13b on the tip ends of the pressing wing portions 12a, 12b abut on the surface of the board 2, so that the surface of the board 2 is pressed by the restoring force. While the pressing protrusions 13a, 13b of the pressing wing portions 12a, 12b press on the surface of the board 2, the underside of the board 2 remains supported by the engaging protruding pieces 16a, 16b. Therefore, the board 2 is firmly held by the engaging protruding pieces 16a, 16b and the pressing protrusions 13a, 13b.

As shown in FIGS. 4B and 5, the engagement protrusion 14 of the electric wire bundle clamp 1 engages in the engagement hole 4 of the board 2. The engagement of the engagement protrusion 14 in the engagement hole 4 prevents the rotation of the electric wire bundle clamp 1 around the leg portion 15, and the electric wire bundle clamp 1 is positioned and firmly fixed relative to the board 2. Since the pressing protrusions 13a, 13b of the pressing wing portions 12a, 12b press the surface of the board 2, the engagement protrusion 14 formed on the middle of the pressing protrusion 13b is biased toward the engagement hole 4, so that the engagement protrusion 14 is more firmly engaged in the engagement hole 4.

When the electric wire bundle clamp 1 is fixed to the board 2 as described above, as shown in FIG. 5, a bundle of a plurality of electric wires K is passed through the curved strip 21 of the clamp member 17, and clamped. Since the clamping of the electric wire bundle by the clamp member 17 is detailed in the aforementioned U.S. Pat. No. 4,609,171, the description thereof is omitted.

In order to detach the electric wire bundle clamp 1 from the board 2, the operator first picks and pulls up the curved strip 21 with fingers. The engagement protrusion 14 is then disengaged and removed from the engagement hole 4.

Since the fixed end of the curved strip 21 is placed between the leg portion 15 and the engagement protrusion 14, by pulling up the curved strip 21, the pressing wing portion 12b is operated as a lever and the lower face of the base 11 which abuts on the board 2 is operated as a fulcrum, and an upward force is applied to the engagement protrusion 14 serving as a point of application. Therefore, the engagement protrusion 14 can easily be detached from the engagement hole 4.

Moreover, the engaging protruding pieces 16a, 16b are substantially vertical to the pressing wing portions 12a, 12b. Therefore, when the pressing wing portion 12b operates as the lever, there is no possibility that the engaging protruding pieces 16a, 16b will inhibit the movement of the pressing wing portion 12b.

Subsequently, to detach the clamp device 1 the operator rotates the clamp member 17 with fingers by 90 degrees in a direction of arrow 'B' in FIG. 4B. Once the clamp device is returned to the condition shown in FIG. 4A, both the leg portion 15 and the engaging protruding pieces 16a, 16b can be easily detached from the attachment hole 3 of the board.

The electric wire bundle clamp 1 of a preferred embodiment provides the following action and effect:

(1) The tip end of the leg portion 15 and the engaging protruding pieces 16a, 16b are protruded from the underside of the board 2. In this embodiment each of the engaging protruding pieces 16a, 16b is formed of a flat thin plate, and extended horizontally from the tip end of the leg portion 15. Therefore, the amount of the electric wire bundle clamp 1 that protrudes from the underside of the board 2 is substantially equal to the thickness of each of the engaging protruding pieces 16a, 16b. Therefore, as compared with a conventional electric wire bundle clamp, the portion of the electric wire bundle clamp 1 of the present invention protruding from the underside of the board 2 is reduced, thus minimizing the space required for securing the clamping device on the underside of the board 2.

(2) Since the engagement protrusion 14 of the electric wire bundle clamp 1 is engaged in the engagement hole 4 of the board 2, the electric wire bundle clamp 1 is further prevented from rotating. Therefore, while the electric wire bundle clamp 1 is positioned relative to the board 2, it can be fixed thereto. Furthermore, with the clamp device being stationary, the direction of the electric wire bundle passing through the curved strip 21 is definable, allowing the electric wire bundle to be easily drawn relative to the board 2.

In order to engage the engagement protrusion 14 in the engagement hole 4, the clamp member 17 is just lifted with fingers and rotated around the leg portion 15. In this case, the operator can easily recognize the engagement by feeling the engagement components click. Therefore, it can be confirmed without taking any special measure whether or not the electric wire bundle clamp 1 is positioned and fixed in the predetermined position on the board 2. As such, the efficiency of the attachment operation is enhanced.

Only the attachment hole 3 and the engagement hole 4 need to be formed in the board 2. These holes 3 and 4 can easily be formed by press processing.

(3) When the electric wire bundle clamp 1 is detached from the board 2, the clamp member 17 is lifted with fingers to disengage the engagement protrusion 14 from the engagement hole 4. Subsequently, the clamp 1 is rotated around the rotating shaft of the leg portion 15 in the direction opposite to the rotating direction at the time of attachment. Therefore, the electric wire bundle clamp 1 can easily be removed from the board 2 making the attachment/detachment operation repeatable. Moreover, the electric wire bundle clamp 1 can easily be attached/detached relative to the board 2 only by performing the operation from the upper surface of the board 2, thereby enhancing the working properties.

(4) The curved strip 21 and each of the engaging protruding pieces 16a, 16b are arranged substantially vertical to each other. Therefore, the electric wire bundle passing through the curved strip 21 is disposed in the same direction as the direction in which the engaging protruding pieces 16a, 16b are extended. Even if a force is applied from the electric wire bundle in a direction in which the curved strip 21 is pushed down, the engaging protruding pieces 16a, 16b support the underside of the board 2 against the pushing-down force. Therefore, the falling down of the electric wire bundle clamp 1 is prevented.

If the curved strip 21 is arranged in the same direction as the extending direction of the engaging protruding pieces 16a, 16b, the widths of the base 11 and the pressing wing portions 12a, 12b need to be set large enough to prevent the electric wire bundle clamp 1 from being pushed down. In this case, the electric wire bundle clamp 1 is increased in size and weight.

On the other hand, in the embodiment, the curved strip 21 and each of the engaging protruding pieces 16a, 16b are arranged vertical to each other. Even if the widths of the base 11 and the pressing wing portions 12a, 12b are reduced, the electric wire bundle clamp 1 does not easily fall down. As a result, the electric wire bundle clamp 1 is reducible in size and weight.

The present invention is not limited to the aforementioned embodiment, and can be modified as follows. Even in the modification, the same action and effect as those in the aforementioned embodiment can be obtained.

Figure 6:
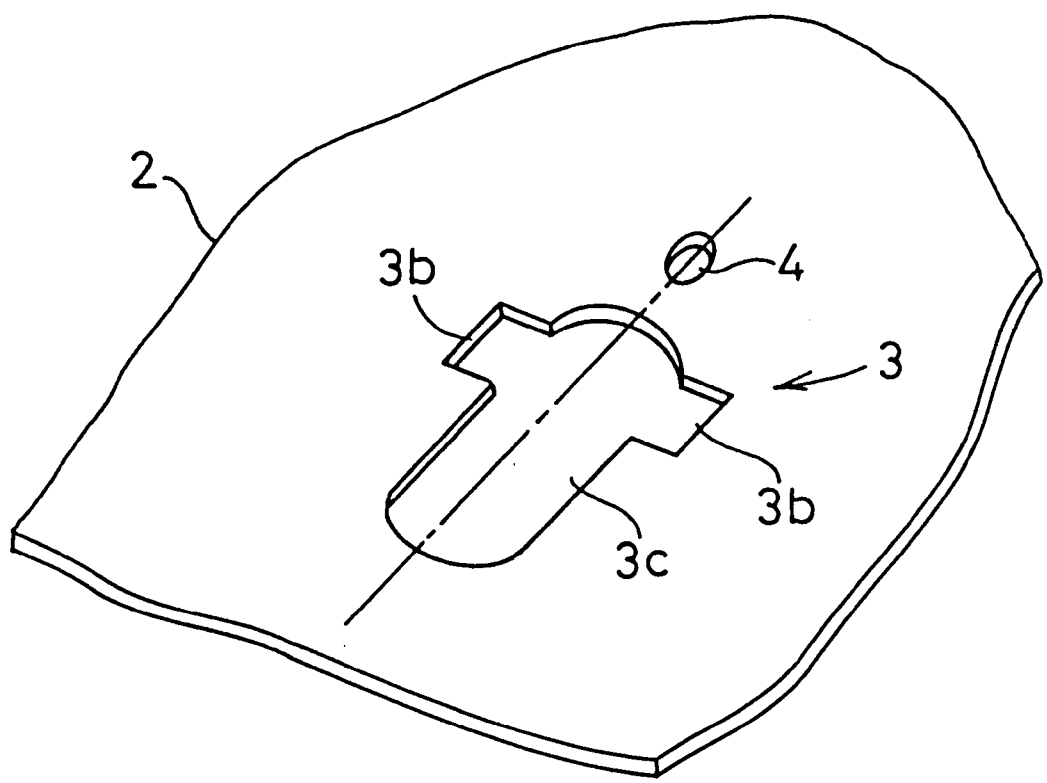
FIG. 6 is a perspective view showing another board to which the electric wire bundle clamp of the embodiment is fixed.

As shown in FIG. 6, the circular hole 3a of the attachment hole 3 in the board 2 is replaced with an elongated hole 3c, and two notches 3b are formed in the periphery of the elongated hole 3c. Additionally, the engagement hole 4 is formed along the longitudinal direction of the elongated hole 3c.

The operation of the electric wire bundle clamp 1 will be described with reference to FIGS. 7 and 8.

Figure 7A:
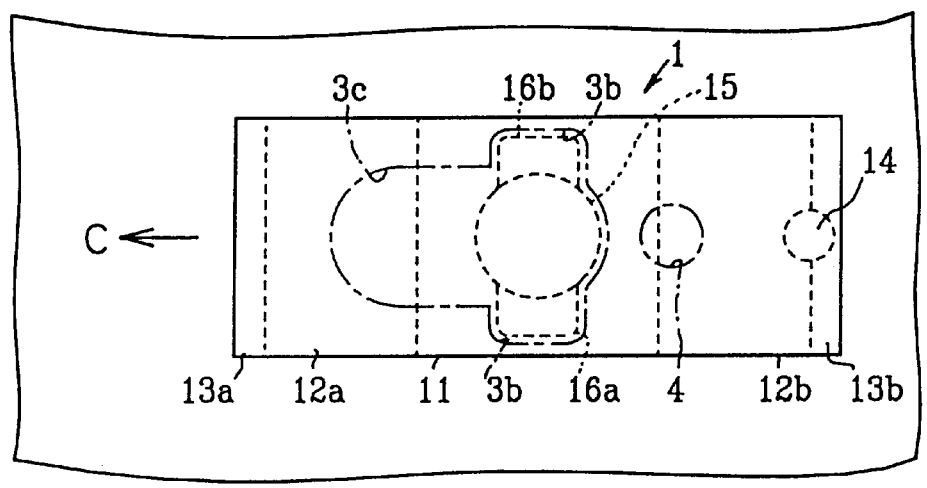
FIGS. 7A and 7B are plan views for use in the description of the operation of the electric wire bundle clamp according to the embodiment; and, FIG. 8 is a sectional view taken along line VIII—VIII of FIG. 7B.
Figure 7B:
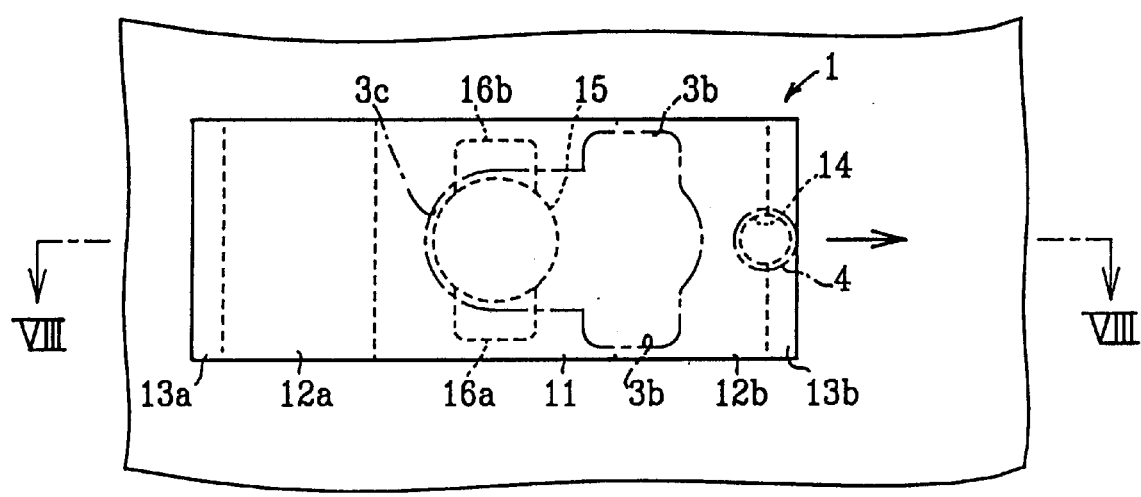

Referring to FIGS. 7A and 7B, the leg portion 15 and the engaging protruding pieces 16a, 16b of the electric wire bundle clamp 1 are inserted to the attachment hole 3 of the board 2. In order to facilitate the understanding of the conditions of the leg portion 15 and the engaging protruding pieces 16a, 16b relative to the board 2, the clamp member 17 is omitted from FIGS. 7A and 7B for convenience.

When the electric wire bundle clamp 1 is attached to the board 2, as shown in FIG. 7A, the leg portion 15 is inserted to the elongated hole 3c of the attachment hole 3, while the engaging protruding pieces 16a, 16b are inserted to the notches 3b. Subsequently, when the operator, holding the clamp member 17 with fingers (not shown), slide the electric wire bundle clamp 1 in the direction of an arrow 'C' in FIG. 7A, the engaging protruding pieces 16a, 16b slide to the underside of the board 2. The portion of the board 2 around the elongated hole 3c enters in a gap between the base 11 and the engaging protruding pieces 16a, 16b. Subsequently, as shown in FIG. 7B, when the leg portion 15 is slid to the end of the elongated hole 3c, the portion of the board 2 around the elongated hole 3c is held between the base 11 positioned on the surface of the board 2 and the engaging protruding pieces 16a, 16b positioned on the underside of the board 2.

Figure 8:
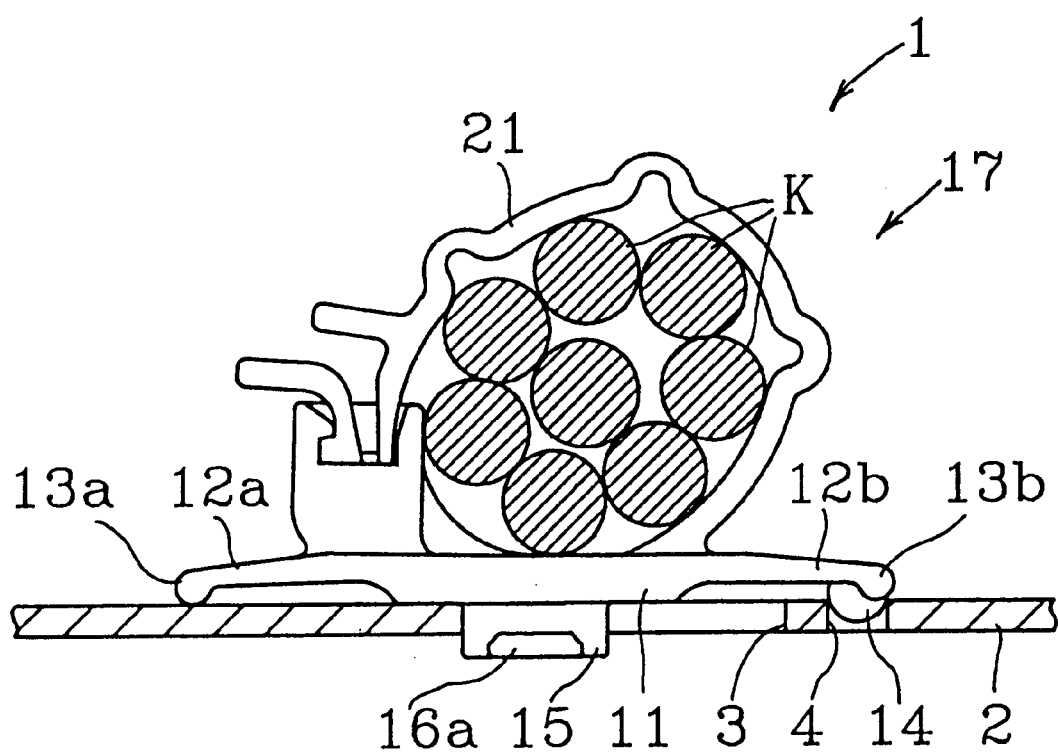

Referring to FIG. 8, each of the pressing wing portions 12a, 12b is formed of a plastic material having an elastic restoring force, and is curved toward the board 2. Therefore, as shown in FIGS. 7B and 8, the pressing protrusions 13a, 13b on the tip ends of the pressing wing portions 12a, 12b abut on the surface of the board 2 to press the surface with the restoring force. While the pressing protrusions 13a, 13b of the pressing wing portions 12a, 12b press the surface of the board 2, the underside of the board 2 remains supported by the engaging protruding pieces 16a, 16b. Thus, the board 2 is pressed/held by the engaging protruding pieces 16a, 16b and the pressing protrusions 13a, 13b.

As shown in FIGS. 7B and 8, the engagement protrusion 14 of the electric wire bundle clamp 1 engages in the engagement hole 4 of the board 2. By engaging the engagement protrusion 14 in the engagement hole 4 further rotation of the electric wire bundle clamp 1 around the leg portion 15 is prevented, thus firmly fixing the electric wire bundle clamp 1 relatively to the board 2. Since the pressing protrusions 13a, 13b of the pressing wing portions 12a, 12b press the surface of the board 2, the engagement protrusion 14 formed on the middle of the pressing protrusion 13b is biased toward the engagement hole 4, so that the engagement protrusion 14 is more firmly engaged in the engagement hole 4.

In order to detach the electric wire bundle clamp 1 from the board 2, the operator first lifts the clamp member 17 with fingers. The engagement protrusion 14 is then disengaged and removed from the engagement hole 4. Subsequently, the operator, holding the clamp member 17 with fingers, slides the electric wire bundle clamp 1 in the direction of an arrow 'D' in FIG. 7B, to return the clamp device to the position shown in FIG. 7A. Positioned as such, the leg portion 15 is disengaged from the elongated hole 3c, while the engaging protruding pieces 16a, 16b are also disengaged from the notches 3b.

With regards to the attachment hole 3, even when the elongated hole 3c is used, the same effect can be obtained as when the circular hole 3a is used.

It is to be appreciated that the sectional shape of the leg portion 15 is not limited to the cylindrical shape. Any sectional shape may be used such as a square pole, a polygonal pole, an elliptic cylinder, and the like. Moreover, the sectional shape of each engaging protruding piece 16a, 16b is not limited to a rectangular shape, and may be semicircular, semi-elliptical, or the like. Additionally, the dimensional configuration of the attachment hole 3 needs to be adapted to the dimensional configurations of the leg portion 15 and the engaging protruding pieces 16a, 16b.

Furthermore, it is to be appreciated that the material of the electric wire bundle clamp 1 is not limited to the plastic material, and a metal or another material having an elastic restoring force may be used. Moreover, the materials of the clamp member 17 and the pressing wing portions 12a, 12b may be different from the materials of the other components of the electric wire bundle clamp 1, and only the clamp member 17 and the pressing wing portions 12a, 12b may be formed of materials having high elasticity.

Finally, the present invention may be applied not only to the electric wire bundle clamp but also to a general clamp device to be fixed to the board.

What is claimed is:

1. A clamp device comprising:

a base;

a leg portion protruded from an undersurface of the base;

an engaging protruding piece protruding from a tip end of the leg portion and the engaging protruding piece extending parallel to the undersurface of the base;

a pressing wing portion extending laterally from the base;

an engagement protrusion protruding from an undersurface of a remote end of the pressing wing portion, and the engagement protrusion being substantially hemispherical in shape;

a clamp member protruding from a top surface of the base; and said leg portion being insertable into a hole formed in a board having a thickness corresponding to a gap spacing between the undersurface of the base and an opposed surface of the engaging protruding piece and the engaging protruding piece being inserted into a notch formed in a periphery of the hole in the board, and once the clamp device is received and sufficiently rotated, within the hole, with respect to the board, the hemispherical shaped engagement protrusion engages with a mating engagement hole formed in the board to prevent further rotation of the clamp device, a portion of the board around a perimeter of the hole being located between the undersurface of the base and the engaging protruding piece, and the undersurface of the remote end of the pressing wing portion abutting and pressing against a top surface of the board so that the hemispherical engagement protrusion is biased into engagement with the mating engagement hole in the board thereby facilitating fixing of the clamp device to the board.

2. The clamp device according to claim 1, wherein the engaging protruding piece and the pressing wing portion are arranged substantially vertical to one another with the base located therebetween.

3. The clamp device according to claim 1, wherein when the clamp device is rotated, once the leg portion is inserted into the hole and used as a rotating shaft, the engaging protruding piece supports an undersurface of the board from the undersurface.

4. A clamp device comprising:

a base;

a leg portion protruded from an undersurface of the base;

an engaging protruding piece protruding from a tip end of the leg portion and the engaging protruding piece extending parallel to the undersurface of the base;

a pressing wing portion extending laterally from the base;

an engagement protrusion protruding from an undersurface of a remote end of the pressing wing portion;

a clamp member protruding from a top surface of the base; and said leg portion being insertable into an elongate hole made in a board having a thickness corresponding to a gap spacing between the undersurface of the base and an opposed surface of the leg portion and the engaging protruding piece being inserted into a notch formed in a periphery of the hole in the board, and following sufficient sliding motion of the clamp device relative to the board, once the leg portion is received in the board, the engagement protrusion engages with a mating engagement hole formed in the board to prevent further sliding motion of the clamp device, a portion of the board around a perimeter of the hole being located the undersurface of the base and the engaging protruding piece, and the undersurface of the remote end of the pressing wing portion abutting and pressing against a top surface of the board so that the engagement protrusion is biased into engagement with the mating engagement hole in the board thereby facilitating fixing of the clamp device to the board.

5. A method of securing a clamp device to a board comprising the steps of:

providing a clamp device having a base with a leg portion protruding from an undersurface of the base and an engaging protruding piece protruding from a tip end of the leg portion, the engaging protruding piece extending parallel to the undersurface of the base, the base further having a pressing wing portion with a hemispherical engagement protrusion protruding from an undersurface of a remote end of the pressing wing portion, and a clamp member protruding from a top surface of the base;

inserting the leg portion with the engaging protruding piece in an engagement hole of the board, and the engagement hole being sized to accommodate both the leg portion and the engaging protruding piece;

rotating the clamp device while engaging a perimeter portion of the board adjacent the engagement hole in a gap formed between the undersurface of the base and an opposed surface of the engaging protruding piece, biasing the hemispherical engagement protrusion, via the remote end of the pressing wing portion, into engagement with a top surface of the board, and continuing to rotate the clamp device until the generally hemispherical engagement protrusion is biased into engagement with a mating engagement hole provided in the board thereby facilitating fixing of the clamp device to the board and preventing further rotation of the clamp device relative to the board.

6. A method of securing a clamp device to a board comprising the steps of:

providing a clamp device having a base with a leg portion protruding from an undersurface of the base and an engaging protruding piece protruding from a tip end of the leg portion, the engaging protruding piece extending parallel to the undersurface of the base, the base further having a pressing wing portion with an engagement protrusion protruding from an undersurface of a remote end of the pressing wing portion, and a clamp member protruding from a top surface of the base;

inserting the leg portion with the engaging protruding piece in an elongate engagement hole of the board, and the elongate engagement hole being sized to accommodate both the leg portion and the engaging protruding piece;

sliding the clamp device relative to the board while engaging a perimeter portion of the board adjacent the elongate engagement hole in a gap formed between the undersurface of the base and an opposed surface of the engaging protruding piece, biasing the engagement protrusion, via the remote end of the pressing wing portion, against a top surface of the board, and once the engagement protrusion is biased into engagement with a mating engagement hole provided in the board, the engagement between the engagement protrusion and the mating engagement hole facilitating fixing of the clamp device to the board and preventing further sliding motion of the clamp device relative to the board.

\* \* \* \* \*